United States Patent
Deuker

(10) Patent No.: US 9,557,236 B2
(45) Date of Patent: Jan. 31, 2017

(54) METHOD FOR CONTROLLING A GAS TURBINE

(75) Inventor: Eberhard Deuker, Mülheim an der Ruhr (DE)

(73) Assignee: SIEMENS AKITENGESELLSCHAFT, München (DE)

( * ) Notice: Subject to any disclaimer, the term of this patent is extended or adjusted under 35 U.S.C. 154(b) by 574 days.

(21) Appl. No.: 13/984,099

(22) PCT Filed: Feb. 8, 2012

(86) PCT No.: PCT/EP2012/052094
§ 371 (c)(1),
(2), (4) Date: Aug. 7, 2013

(87) PCT Pub. No.: WO2012/107467
PCT Pub. Date: Aug. 16, 2012

(65) Prior Publication Data
US 2013/0325370 A1 Dec. 5, 2013

(30) Foreign Application Priority Data
Feb. 11, 2011 (EP) ..................... 11154149

(51) Int. Cl.
*G06F 17/00* (2006.01)
*G01L 7/00* (2006.01)
(Continued)

(52) U.S. Cl.
CPC . *G01L 7/00* (2013.01); *F02C 9/28* (2013.01); *G05B 23/0221* (2013.01);
(Continued)

(58) Field of Classification Search
CPC .............. G01B 11/14; G01L 7/00; G01L 7/02; G01F 17/00; F02C 9/28; F02C 3/02; G05B 23/0221; G06F 17/10; G06F 17/11
(Continued)

(56) References Cited

U.S. PATENT DOCUMENTS

| | | | |
|---|---|---|---|
| 5,105,372 A | 4/1992 | Nevell | |
| 6,118,187 A * | 9/2000 | Hepner | H02P 9/04 290/40 B |

(Continued)

FOREIGN PATENT DOCUMENTS

| | | |
|---|---|---|
| CN | 101207665 A | 6/2008 |
| DE | 4232826 C1 | 10/1993 |

(Continued)

OTHER PUBLICATIONS

Exponential smoothing: The state of the art—Part II; E Gardner Jr: International Journal of Forecasting, Bd. 22, Nr. 4, Oct. 1, 2006 (Oct. 1, 2006), Seiten 637-666, XP55002644, ISSN: 0169-2070, 001: 10.1016/j.ijforecast.2006.03.005 * Seite 653, Spalte 1, Absatz 1—Seite 654, Spalte 1, Absatz 1 * * Seite 640; Tabelle 1; 2006; Oct. 1, 2006.

*Primary Examiner* — John Breene
*Assistant Examiner* — Lynda Dinh

(57) ABSTRACT

A method for controlling a gas turbine, wherein measurement signal values are measured at different times, namely at least a first time and a second time, wherein the first time lies before the second time and wherein attenuated signal values are generated from the measurement signal values by smoothing the measured measurement signal values by means of a attenuation factor, wherein a different attenuation (Continued)

factor is used depending on the difference of the measurement signal value at the second time and the attenuated signal value at the first time.

4 Claims, 1 Drawing Sheet

(51) Int. Cl.
    *F02C 9/28*     (2006.01)
    *G06F 17/10*     (2006.01)
    *G05B 23/02*     (2006.01)
    *G01L 7/02*     (2006.01)
    *F02C 3/02*     (2006.01)

(52) U.S. Cl.
    CPC ............... *G06F 17/10* (2013.01); *F02C 3/02* (2013.01); *G01L 7/02* (2013.01)

(58) Field of Classification Search
    USPC ...................................................... 702/50, 57
    See application file for complete search history.

(56) References Cited

U.S. PATENT DOCUMENTS

| | | |
|---|---|---|
| 2008/0120074 A1 | 5/2008 | Volponi |
| 2008/0290929 A1* | 11/2008 | O'Dowd ............. H03K 17/945 327/517 |

FOREIGN PATENT DOCUMENTS

| | | |
|---|---|---|
| EP | 1643332 A2 | 4/2006 |
| EP | 1926001 A2 | 5/2008 |
| JP | 2006105142 A | 4/2006 |
| RU | 2168044 C2 | 5/2001 |
| RU | 2358133 C2 | 6/2009 |

* cited by examiner

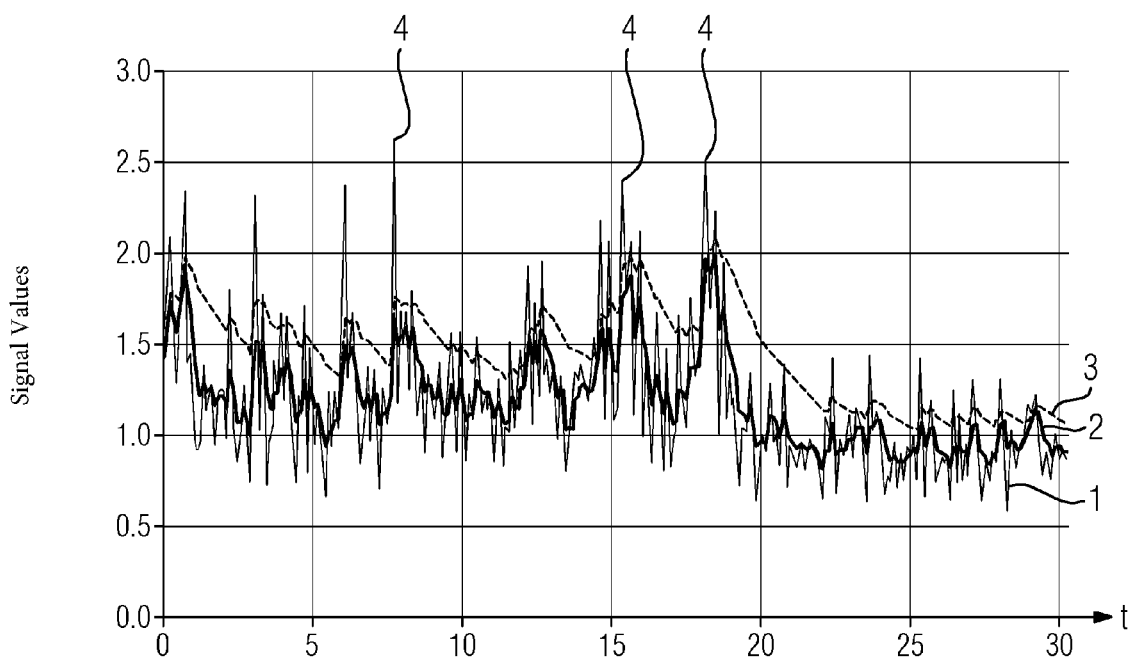

METHOD FOR CONTROLLING A GAS TURBINE

CROSS REFERENCE TO RELATED APPLICATIONS

This application is the US National Stage of International Application No. PCT/EP2012/052094 filed Feb. 8, 2012 and claims benefit thereof, the entire content of which is hereby incorporated herein by reference. The International Application claims priority to the European Patent Office application No. 11154149.6 EP filed Feb. 11, 2011, the entire contents of which is hereby incorporated herein by reference.

FIELD OF INVENTION

The invention relates to a method for regulating a gas turbine, wherein measurement signal values are measured at different points in time, namely at at least a first point in time and a second point in time, wherein the first point in time is located before the second point in time and wherein attenuated signal values are generated from the measurement signal values, in that the measured measurement signal values undergo smoothing by an attenuation factor.

BACKGROUND OF INVENTION

A gas turbine is a turbo machine which generally comprises a compressor, a turbine and a combustor section. Ambient air which has been sucked in is compressed in the compressor and the compressed air is ultimately supplied to the combustor section. Arranged in the combustor section is at least one combustion chamber, mostly having a plurality of burners to which the compressed air is supplied. In addition to the compressed air, a fuel is also supplied to the burners which mixes with the air and is combusted. The resulting hot combustion gases are supplied to the turbine where they expand and cool down, thereby allowing the turbine to rotate. In so doing, the thermal energy from the combustion gases is converted into mechanical activity which on the one hand is used to drive the compressor and on the other hand is used to drive a load, for example of a generator for generating electricity.

It must be ensured that a stable flame is present during combustion in the combustion chamber. Flame instabilities occur in particular due to resonant combustion oscillations in the combustion gas and can lead on the one hand to increased pollutant emissions and on the other hand to oscillations and vibrations of the combustion chamber, which adversely affect the service life of the combustion chamber and shortens intervals between maintenance.

The combustion stability of gas turbines and other combustion plants is usually assessed using measurement signals, the timing of which fluctuates highly. These can be for instance measurement signals resulting from acceleration or pressure amplitude measurement on the combustion chamber. In order to suppress unwanted high-frequency components, the measurement signals are usually attenuated. However, peaks frequently occur at specific intervals over the height course of the measurement. This can also be referred to as a "picket fence" course. Between the peaks, the height drops to a completely non-critical value. A single peak also remains non-critical. Should the peaks repeat however, and if either the height of the peaks increases or the succession of peaks becomes more frequent, this indicates an incipient instability.

Up to now, what are known as peak hold value signals, also known as peak hold signals, have mostly been used for regulation. Here, only the maximum occurring height is relayed as a signal value for a defined time period. However, this signal does not provide any information about the frequency of the peaks. If the time window is large, a critical, high amplitude value is transmitted to the regulator, although under certain circumstances, only an individual, non-hazardous peak was present. If the time window is very small, so that per time period one peak is expected at the most, high and low signals alternate in rapid succession, resulting in an unsettled and often very inefficient regulation.

SUMMARY OF INVENTION

The object of the invention is to provide a method for regulating a gas turbine which avoids the disadvantages described above.

According to the invention, this object is achieved by the provision of a method for regulating a gas turbine wherein measurement signal values are measured at different points in time, namely at at least a first point in time and a second point in time. In this case the first point in time is located before the second point in time. Attenuated signal values are generated from the measurement signal values, in that the measured measurement signal values undergo smoothing by an attenuation factor. Depending on the difference in the measurement signal value at the second point in time and the attenuated signal value at the first point in time, a different attenuation factor is used. Signal values are thereby formed which react to the amplitude height as well as the repetition frequency of the peaks. Efficient regulation is thereby possible. The smoothing is an exponential smoothing. This allows a particularly effective smoothing of time series values, which show no systemization.

Advantageous developments of the invention are defined in the dependent claims.

The attenuated signal value is advantageously formed from the sum of two products, wherein the first product is the multiplication of the attenuation factor and the measurement signal value measured at the second point in time and the second product is the multiplication of the differential value one minus the attenuation factor and the attenuated signal value at the first point in time. This is particularly simple to realize.

In a particularly preferred embodiment, a higher attenuation factor (=low attenuation) is used if the measurement signal value measured at the second point in time is larger or the same as the attenuated signal value at the first point in time, than if the measurement signal value measured at the second point in time is smaller than the attenuated signal value at the first point in time.

The ascent of a suddenly occurring peak therefore provides for a weak attenuation, in other words the attenuation factor is high so the attenuated signal values rise sharply during the ascent of the peak. When the peak drops, a strong attenuation is triggered, in other words the attenuation factor is low. The attenuated signal values therefore only drop slowly.

BRIEF DESCRIPTION OF THE DRAWINGS

Other features, characteristics and advantages of the present invention will become apparent from the following description of an exemplary embodiment with reference to the accompanying FIGURE.

The FIGURE shows a diagram in which the measurement signal, the attenuated signal value according to the prior art and the attenuated signal value according to the invention are plotted over time t.

DETAILED DESCRIPTION OF INVENTION

The FIGURE shows a curve 1 with measurement signal values which were plotted over time t. The course of the measurement signal 1 has peaks 4 which initially occur every two to three seconds or so. Measurement signal values of above around 2.0 are seen here once as critical. If the repetition frequency of these peaks 4 is correspondingly high, a corrective action should take place. Between the time t=14 and the time t=19, the number of peaks 4 increases. At the time t=19 a change of the operating state was effected. The curve 1 along with the measurement signal values subsequently shows a sufficiently smooth course.

In the curve 2 the attenuated signal values according to the prior art are generated from the measurement signal values of the curve 1 which are plotted over time t. The high-frequency components are avoided through the attenuation according to the prior art. The curve 2 does however drop off sharply over and over again between the peaks 4. For the signal values attenuated according to the prior art in curve 2, no value can be provided however which is decisively unambiguously critical or non-critical: Values between 0.95 and 1.15 occur in the critical phase up to the time t=19 as well as in the non-critical phase thereafter. Efficient regulation is therefore not possible.

The curve 3 was generated by the inventive method. In this case, measurement signal values $M_{n1}$, $M_{n2}$ are measured at different points in time n1, n2, namely at at least a first point in time n1 and a second point in time n2, wherein the first point in time n1 is located before the second point in time n2. The measured measurement signal values $M_{n1}$ and $M_{n2}$ undergo an exponential smoothing with an attenuation factor λ. This allows the generation of signal values $S_{n1}$ and $S_{n2}$. In this case a higher attenuation factor λ is used if the measurement signal value $M_{n2}$ measured at the second point in time n2 is larger or the same as the attenuated signal value $S_{n1}$ at the first point in time n1, than if the measurement signal value $M_{n2}$ measured at the second point n2 in time is smaller than the attenuated signal value $S_{n1}$ at the first point in time n1.

This exponential smoothing is indicated by the following formula:

$$S_{n2}=\lambda_x * M_{n2}+(1-\lambda_x)*S_{n1} \text{ where } x=1.2$$

wherein:
x=2 if $M_{n2} \geq S_{n1}$
x=1 if $M_{n2} < S_{n1}$
where $\lambda_2 > \lambda_1$ Wherein $\lambda_x$, x=1.2 is the attenuation factor, $M_{n2}$ the measured measurement signal value at the point in time n2, $M_{n1}$ the measured measurement signal value at the point in time n1, $S_{n1}$ the attenuated signal value at the point in time n1 and $S_{n2}$ the attenuated signal value at the point in time n1.

In the inventive attenuated signal values in the exemplary embodiment, $\lambda_2=0.3$ and $\lambda_1=0.05$ are selected by way of example. Following a peak 4, an inventively attenuated signal value drops off in curve 3 significantly more slowly than is the case for a signal value in curve 2 attenuated according to a prior art method. This results in the inventively attenuated signal value reaching higher values in the chronologically subsequent peak 4 than the signal value attenuated according to the prior art. In terms of regulation, this is often a desired effect. Between the time t=14 and the time t=19, the frequency of the peaks 4 increases. Here it can be observed that the inventively attenuated signal values in the very critical time window remain above 1.5, while the signal values attenuated according to the prior art in curve 2 drop once again to almost 1.0. In the critical time between t=0 and t=19 on the other hand, the inventively attenuated signal values never drop below 1.3 and subsequently never rises above 1.16 in the non-critical time. A suddenly occurring peak 4 therefore provides in its ascent for a weak attenuation, i.e. the attenuation factor 2 is high and the attenuated signal values will therefore rapidly rise during the ascent of the peak. As the peak 4 drops, a switch to a strong attenuation is triggered, i.e. the attenuation factor 2 is low. The attenuated signal values therefore only drop off slowly. Efficient regulation of a gas turbine can therefore be accomplished with the inventive method which reacts quickly to a peak (by switching to weak attenuation) but also evaluates a rapid succession of peaks as more critical than individual peaks.

The invention claimed is:

1. A method for controlling a gas turbine, comprising:
   operating the gas turbine;
   measuring a plurality of measurement signal values indicative of combustion oscillations that develop in a combustion chamber of the gas turbine during the operating of the gas turbine, the measurement signal values having peaks with amplitude and frequency variation during the operating of the gas turbine, the measurement signal values including a first measurement signal and a second measurement signal at different points in time, at least a first point in time and a second point in time wherein the first point in time is located before the second point in time;
   generating a plurality of attenuated signal values, a first attenuated signal and a second attenuated signal, from the plurality of measurement signal values, in that the measured measurement signal values undergo a smoothing with an attenuation factor,
   wherein depending on the difference between the second measurement signal value at the second point in time and the first attenuated signal value at the first point in time, a different attenuation factor is used for control of the combustion oscillations,
   wherein the smoothing is an exponential smoothing; and
   wherein the smoothing of the measured measurement signal values performed to generate the plurality of attenuated signal values used for control of the combustion oscillations is responsive to both the amplitude and the frequency variation of the peaks that occur in the measurement signal values during the operating of the gas turbine and thus conducive to efficient control of the combustion oscillations in the combustion chamber of the gas turbine.

2. The method according to claim 1,
   wherein the second attenuated signal value is formed from the sum of two products,
   wherein the first product is the multiplication of the attenuation factor the second measurement signal value measured at the second point in time, and
   wherein the second product is the multiplication of a differential value of one minus the attenuation factor and the first attenuated signal value at the first point in time.

3. The method according to claim 1,
   wherein a higher attenuation factor is used when the second measurement signal value measured at the second point in time is larger or the same as the first attenuated signal value at the first point in time, than when the second measurement signal value measured at the second point in time is smaller than the first attenuated signal value at the first point in time.

4. A method for controlling a gas turbine, comprising:

operating the gas turbine;

measuring a plurality of measurement signal values indicative of combustion oscillations that develop in a combustion chamber of the gas turbine during the operating of the gas turbine, the measurement signal values having peaks with amplitude and frequency variation during the operating of the gas turbine, the measurement signal values including a first measurement signal and a second measurement signal at different points in time, at least a first point in time and a second point in time wherein the first point in time is located before the second point in time;

generating a plurality of attenuated signal values, a first attenuated signal and a second attenuated signal, from the plurality of measurement signal values, in that the measured measurement signal values undergo a smoothing with a respective attenuation factor, wherein depending on the difference between the second measurement signal value at the second point in time and the first attenuated signal value at the first point in time, a different attenuation factor is used for control of the combustion oscillations, wherein the smoothing is an exponential smoothing, wherein the exponential smoothing is characterized by the following relationships:

$$S_{n2} = \lambda_x * M_{n2} + (1-\lambda_x) * S_{n1} \text{ where } x=1.2$$

wherein, $x=2$ if $M_{n2} \geq S_{n1}$ $x=1$ if $M_{n2} < S_{n1}$ $\lambda_2 > \lambda_1$, $\lambda_x$, $x=1.2$ represents the different attenuation factors, $M_{n2}$ is the measured measurement signal value at the point in time n2, $S_{n1}$ is the attenuated signal value at the point in time n1 and $S_{n2}$ is the attenuated signal value at the point in time n2, and wherein the smoothing of the measured measurement signal values performed to generate the plurality of attenuated signal values used for control of the combustion oscillations is responsive to both the amplitude and frequency variation of the peaks that occur in the measurement signal values during the operating of the gas turbine and thus conducive to efficient control of the combustion oscillations in the combustion chamber of the gas turbine.

* * * * *